United States Patent
Roth

(12) 
(10) Patent No.: US 6,240,229 B1
(45) Date of Patent: May 29, 2001

(54) CONNECTOR ASSEMBLY

(75) Inventor: Richard F. Roth, Downers Grove, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/218,369

(22) Filed: Dec. 21, 1998

(51) Int. Cl.[7] .................................................. G02B 6/36
(52) U.S. Cl. ................................................................ 385/53
(58) Field of Search ................................. 385/53, 56, 58, 385/59, 60; 361/785, 789; 439/246–252

(56) References Cited

U.S. PATENT DOCUMENTS

| | | | |
|---|---|---|---|
| 4,895,425 | 1/1990 | Iwano et al. | 350/96.2 |
| 5,121,454 | 6/1992 | Iwano et al. | 385/60 |
| 5,404,416 | 4/1995 | Iwano et al. | 385/60 |
| 5,418,875 | 5/1995 | Nakano et al. | 385/77 |
| 5,528,711 | 6/1996 | Iwano et al. | 385/56 |
| 5,537,501 | 7/1996 | Iwano et al. | 385/58 |
| 5,673,346 | 9/1997 | Iwano et al. | 385/60 |

FOREIGN PATENT DOCUMENTS 196 19 374   8/1997   (DE).

*Primary Examiner*—Frank G. Font
*Assistant Examiner*—Michael P. Stafira
(74) *Attorney, Agent, or Firm*—A. A. Tirva

(57) ABSTRACT

A connector assembly is disclosed for mounting through an aperture in a panel. The assembly includes an adapter mountable in the aperture in the panel. The adapter has engagement arms for engaging the panel and restricting relative movement between the adapter and the panel. A connector is insertable into the adapter in an insertion direction. Releases are provided on the connector for disengaging the engagement arms of the adapter from the panel in response to inserting the connector into the adapter and, thereby, remove the restriction on the relative movement between the adapter and the panel.

20 Claims, 5 Drawing Sheets

US 6,240,229 B1

CONNECTOR ASSEMBLY

FIELD OF THE INVENTION

This invention generally relates to the art of connector assembly such as fiber optic connector assemblies.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like. The adapter may be mounted on a printed circuit board such as a motherboard, and one of the connectors received by the adapter may be mounted to a daughterboard.

The present invention is directed to various improvements in such connector apparatus.

SUMMARY OF THE INVENTION

An object, therefore, of the invention is to provide a new and improved connector assembly of the character described.

In the exemplary embodiment of the invention, the assembly includes an adapter mountable in an aperture in a panel. The adapter includes engagement means for restricting relative movement between the adapter and the panel. A fiber optic connector is insertable into the adapter in an insertion direction. Release means are provided on the fiber optic connector operatively associated with the engagement means to disengage the engagement means in response to inserting the connector into the adapter. Therefore, the restriction on relative movement between the adapter and the panel is removed when the connector is coupled to the adapter.

As disclosed herein, the engagement means is provided by at least one flexible latch arm on the adapter engageable with the panel at the aperture. The release means comprises a detent, such as an angled surface, on the fiber optic connector engageable with the flexible latch arm to move the latch arm out of engagement with the panel. The adapter includes a housing which is larger than the aperture in the panel and which is engageable with one side of the panel. The flexible latch arm is engageable with an opposite side of the panel. The housing has a first receptacle end adapted for receiving the fiber optic connector and a second receptacle end adapted for receiving an associated fiber optic transmission means. The housing is a two-part housing containing at least one shutter member therewithin.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 2:
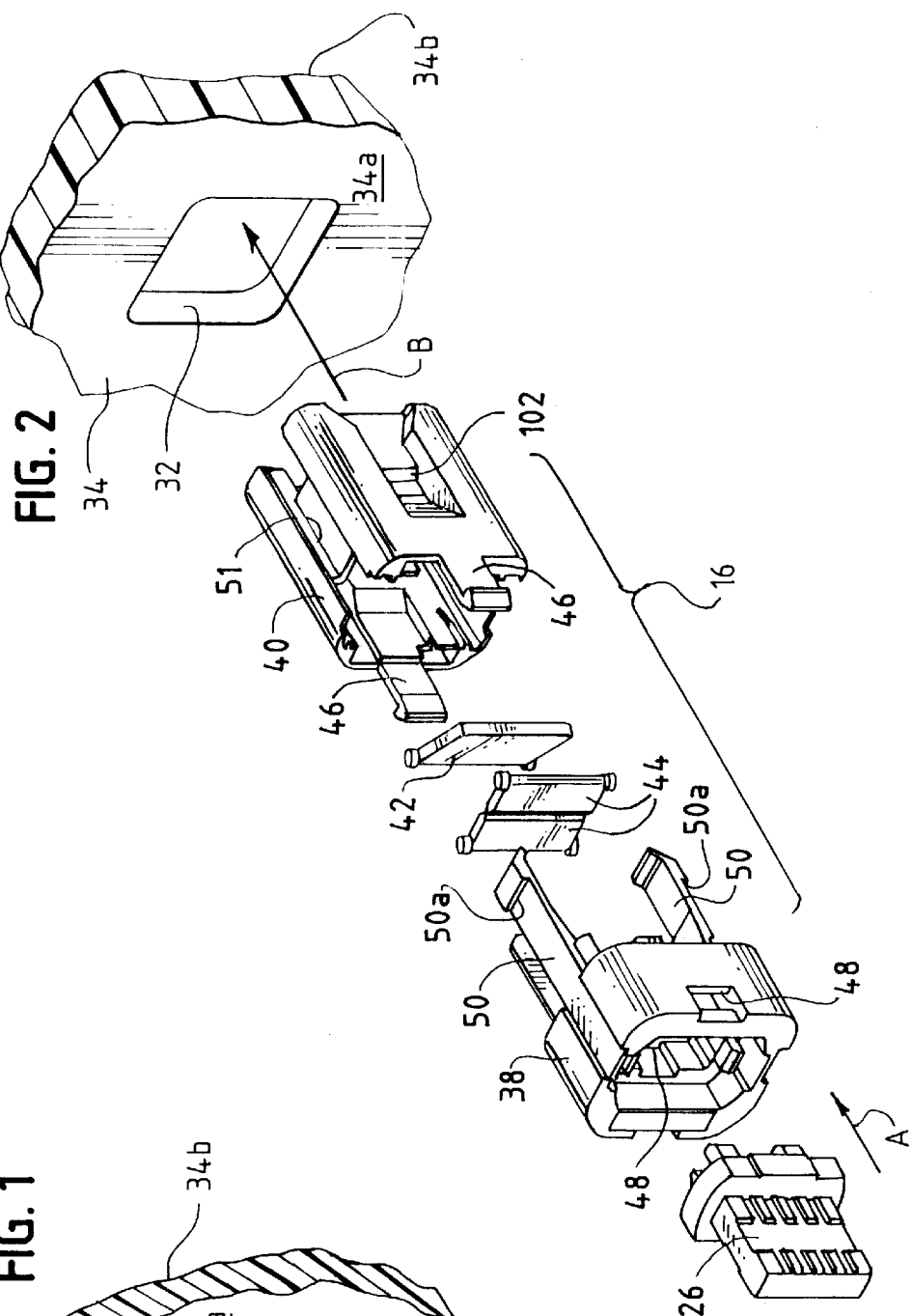
FIG. 2 is an exploded perspective view of the motherboard adapter assembly in conjunction with the motherboard.

Referring to the drawings in greater detail, a fiber optic connector assembly incorporating the concepts of the invention includes a motherboard adapter assembly, generally designated 16 and shown in FIGS. 1–6. FIGS. 7–10 show a daughterboard connector assembly, generally designated 18, which is mateable or capable of being coupled to motherboard adapter assembly 16. A dust cap 26 (FIG. 2) is insertable into adapter assembly 16 in the direction of arrow "A". The adapter assembly is insertable into an aperture 32 in a panel 34 in the direction of arrow "B". In the fiber optic connector assembly herein, panel 34 is a printed circuit board (motherboard).

Figure 1:
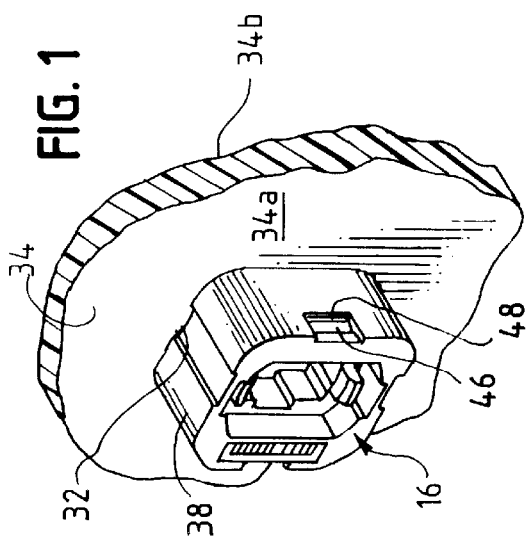
FIG. 1 is a perspective view of the motherboard adapter assembly mounted through an aperture in a printed circuit board (motherboard)

Referring first to FIGS. 1 and 2, motherboard adapter assembly 16 generally is a two-part structure including a first or front part 38 and a second or rear part 40. A single shutter member 42 and a set of dual shutter members 44 are mounted within the adapter assembly. The two parts 38 and 40 of the adapter assembly are interconnected by means of a pair of hooked flexible latch arms 46 projecting from rear adapter part 40 and insertable into the inside of front adapter part 38 for snapping into engagement with a pair of fixed latch shoulders 48 formed by apertures in the side walls of the front adapter part.

As stated above, adapter assembly 16 is insertable into aperture 32 in motherboard 34 in the direction of arrow "B" (FIG. 2). As seen in FIG. 1, front adapter part 38 is larger than aperture 32 in motherboard 34 and, consequently, abuts against a front side 34a of the motherboard. The adapter assembly is secured to the motherboard and within aperture 32 by means of a pair of flexible latch arms 50 having retention shoulder 50a near the distal ends thereof. The retention arms move into grooves 51 in rear adapter part 40, and retention shoulders 50a of the latch arms engage a rear side 34b of motherboard 34 when the adapter assembly is mounted within aperture 32 in motherboard 34 as seen in FIG. 1. Latch arms 50 restrict relative movement between the adapter assembly and the motherboard in the insertion direction "B".

Figure 3:
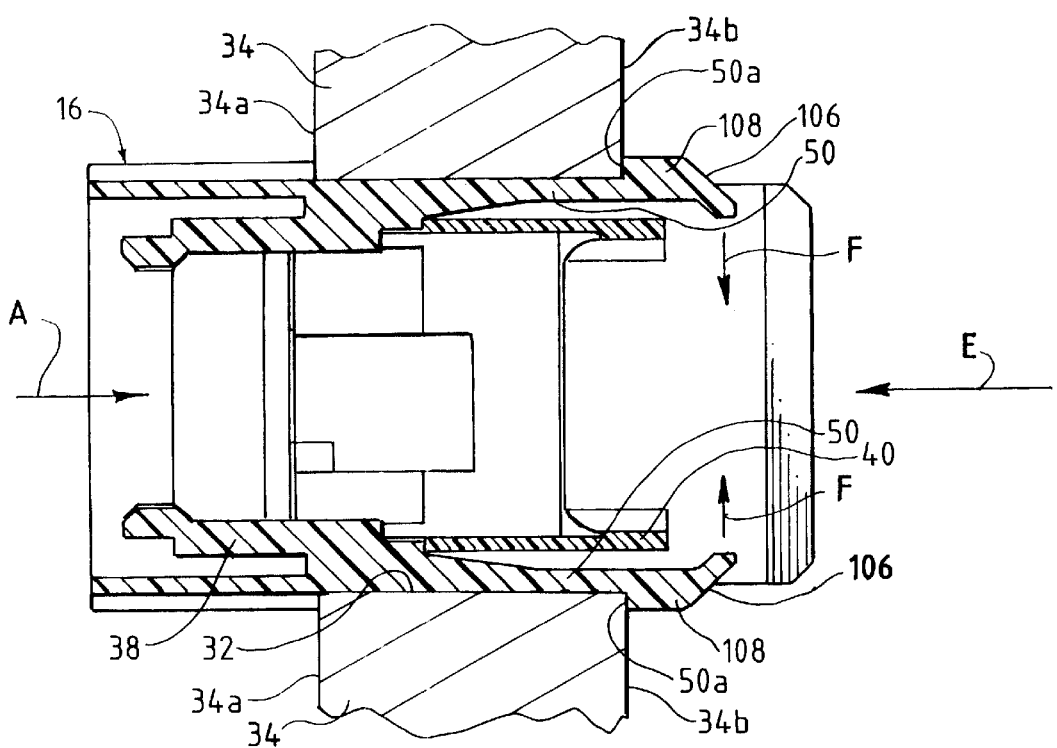
FIG. 3 is an enlarged vertical section through the motherboard adapter assembly mounted in the panel.

Referring to FIG. 3 in conjunction with FIG. 2, motherboard adapter assembly 16 has been inserted into aperture 32 in motherboard 34. It can be seen that front adapter part 38 engages the front side 34a of the motherboard, and retention shoulders 50a of flexible latch arms 50 engage rear side 34b of the motherboard. Therefore, relative movement between the motherboard adapter assembly and the motherboard in the axial or insertion direction of the assembly is restricted.

Figure 4:
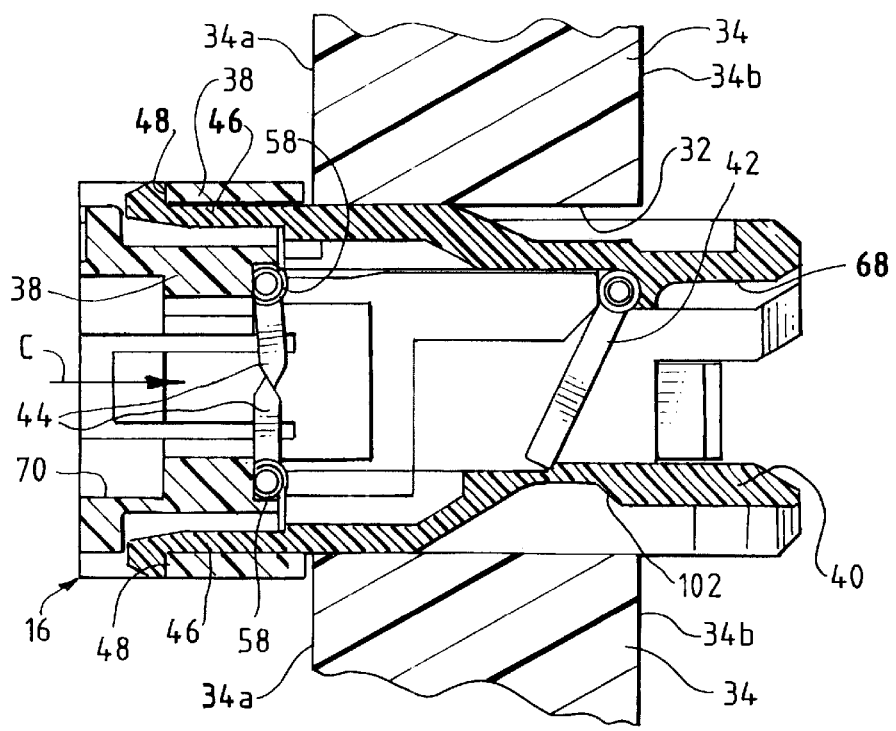
FIG. 4 is an enlarged horizontal section through the motherboard adapter assembly mounted in the panel.

FIG. 4 shows a pair of coil springs 58 which bias dual shutter members 44 to a closed position. When an associated fiber optic transmission means, such as a fiber optic connector, is inserted into the motherboard adapter assembly in the direction of arrow "C", shutter members 44 will be biased open, and coil springs 58 will automatically close the shutter members when the associated connector is removed.

Figure 5:
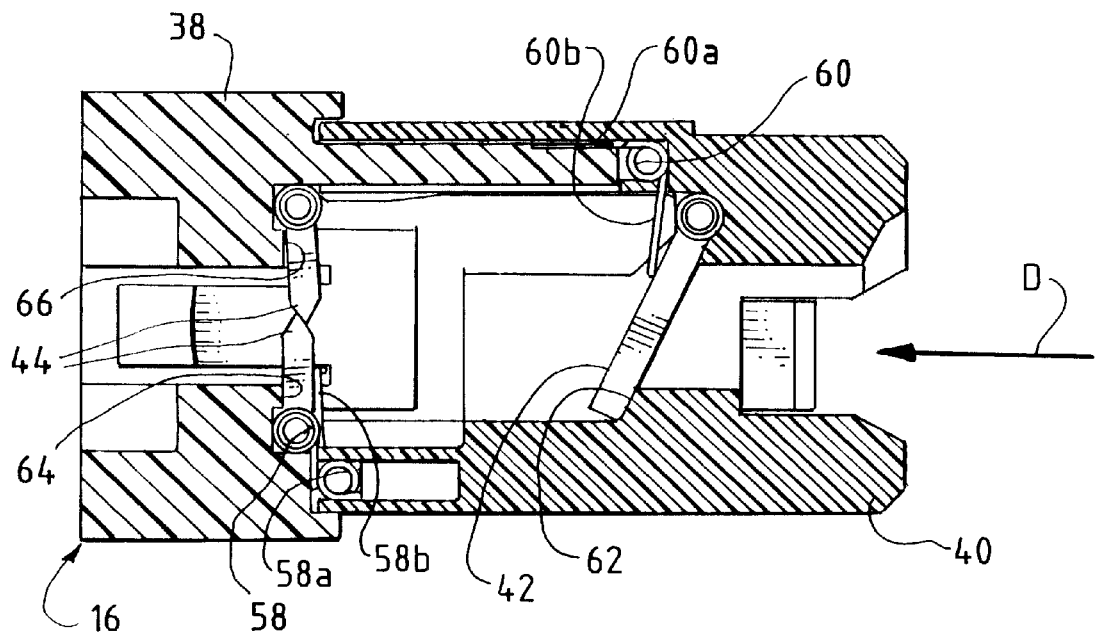
FIGS. 5 and 6 are horizontal sections similar to that of FIG. 4, but taken at different locations to show the mounting of the shutter members within the assembly.
Figure 6:
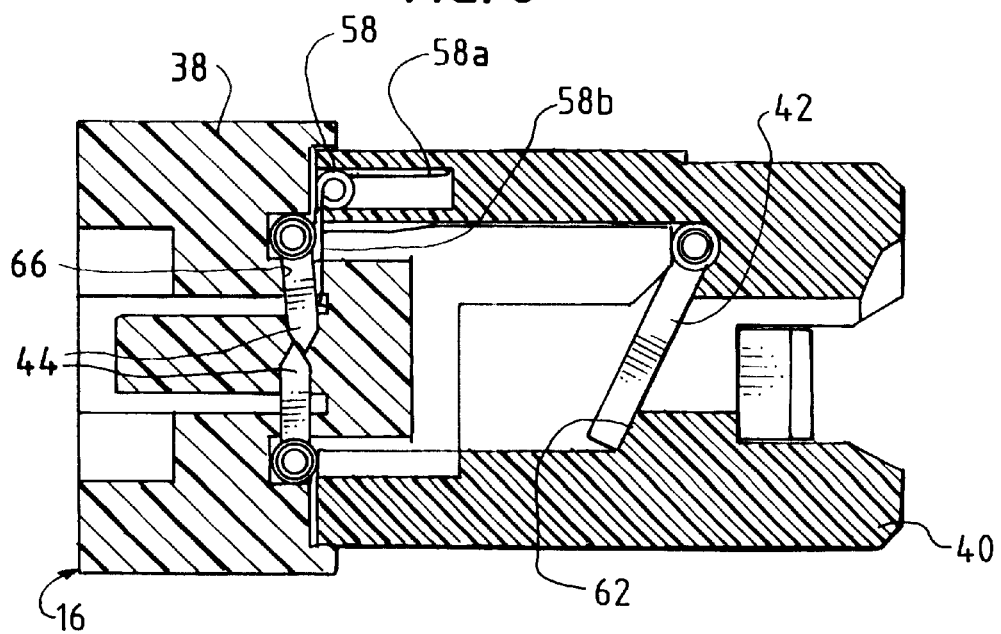
Figure 7:
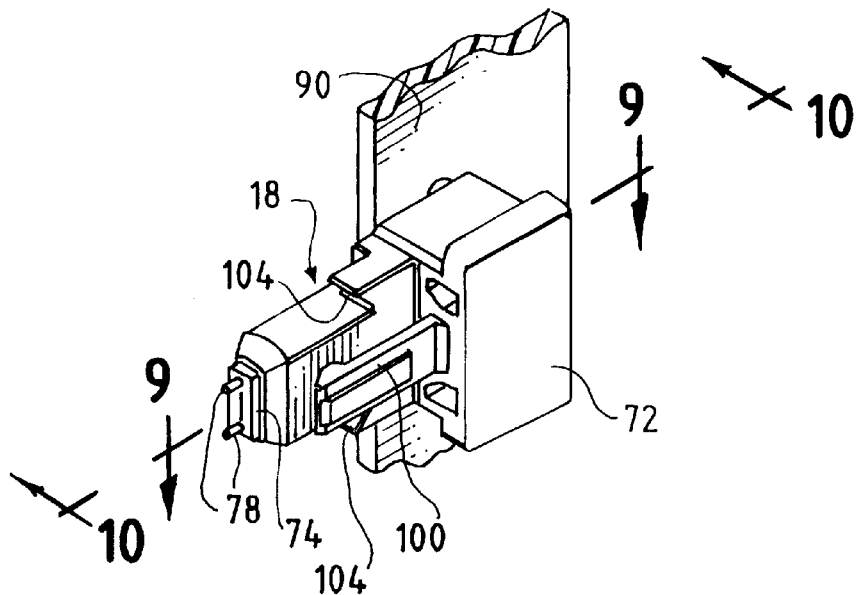
FIG. 7 is a perspective view of the daughterboard connector assembly mounted to a second printed circuit board (daughterboard)

FIG. 5 shows a coil spring 60 having one end 60a locked within the adapter assembly and an opposite end 60b engaging the back side of single shutter member 42. This spring biases the shutter member against a stop 62 in a closed position. When a fiber optic connector (described hereinafter) is inserted into adapter assembly 16 in the direction of arrow "D", shutter member 42 is biased open against spring 60. When the connector is removed, the spring biases shutter member 42 back to its closed position shown in FIG. 5. This depiction also shows that one of the springs 58 includes a fixed end 58a locked in the adapter assembly and an opposite end 50b for biasing one of the dual shutter members 44 against a stop 64. FIG. 6 shows the other spring 58 having a fixed end 58a and an opposite end 58b for biasing the other shutter member 44 against a stop 66 in the closed position. Basically, as best seen in FIG. 4, adapter assembly 16 is an open-ended assembly defining a first receptacle end 68 for receiving daughterboard connector assembly 18 (FIGS. 7–10) and a second receptacle end 70 for receiving an associated fiber optic transmission means such as a second fiber optic connector.

Figure 8:
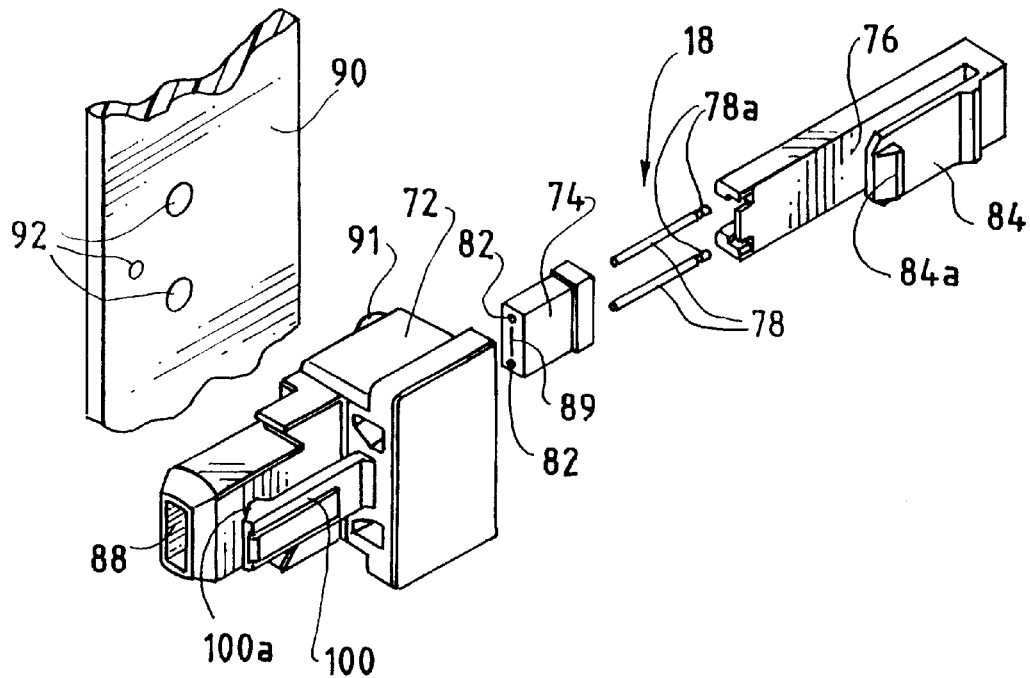
FIG. 8 is an exploded perspective view of the daughterboard connector assembly in conjunction with the daughterboard.
Figure 9:
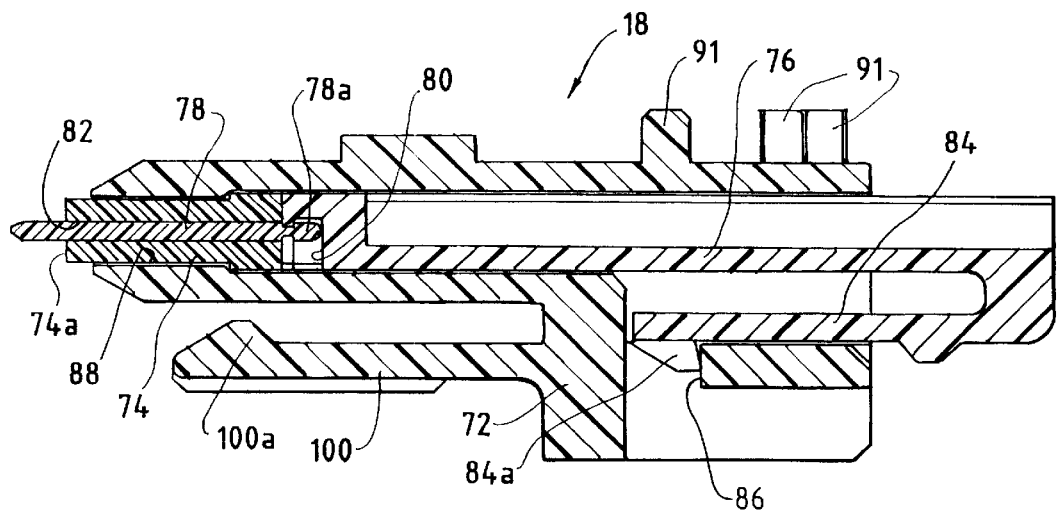
FIG. 9 is a horizontal section taken generally along line 9—9 of FIG. 7.
Figure 10:
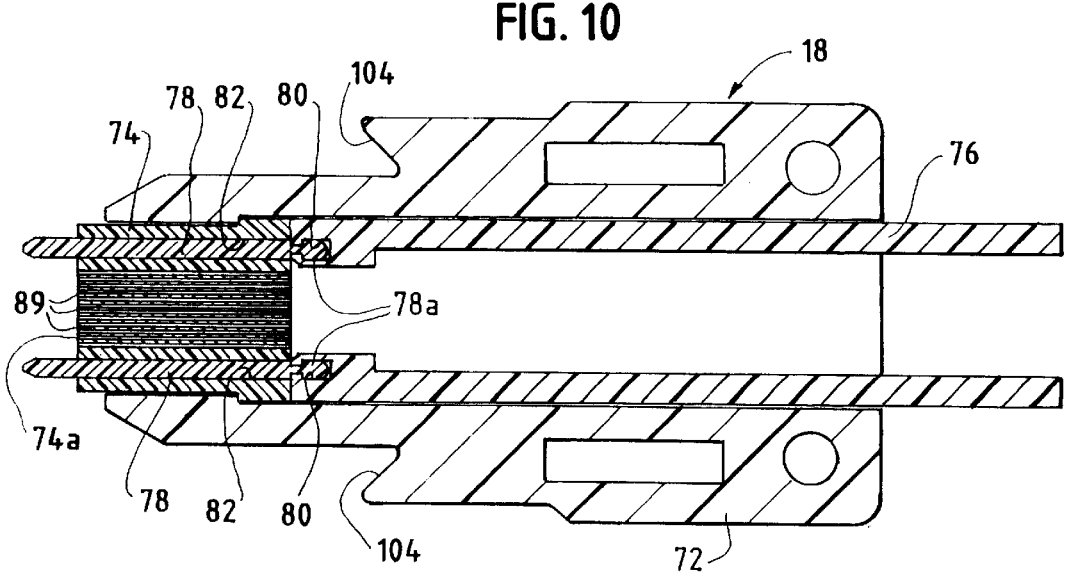
FIG. 10 is a vertical section taken generally along line 10—10 of FIG. 7.

Referring to FIGS. 7–10, daughterboard connector assembly 18 includes a daughterboard housing 72 mounting a ferrule 74, a pin holder 76 and a pair of alignment pins 78. As seen in FIGS. 9 and 10, the alignment pins have head portions 78a captured within recesses or slots 80 at the front end of pin holder 76, and the alignment pins project through bores 82 in ferrule 74. The alignment pins project forwardly of a front mating face 74a of the ferrule for insertion into appropriate alignment holes in the ferrule of the second connector which is inserted into receptacle end 70 (FIG. 4) of adapter assembly 16. As best seen in FIG. 9, pin holder 76 has a forwardly cantilevered flexible latch arm 84 with a hook 84a at a distal end thereof for engagement behind a latch shoulder 86 on daughterboard housing 72 to hold the pin holder within the housing and to position ferrule 74 through a forward opening 88 of the housing. As seen in FIG. 10, ferrule 74 has a plurality of parallel passages 89 for receiving the fibers of a flat multi-fiber optical cable.

The daughterboard housing 72 of daughterboard connector assembly 18 is mounted to a printed circuit board (daughterboard) 90 by means of mounting posts 91 on the daughterboard housing insertable into mounting holes 92 in the daughterboard. The diameters of mounting posts 91 may be smaller than the diameters of mounting holes 92 to provide a degree of floating movement between the daughterboard connector assembly and the daughterboard.

Referring to FIGS. 8 and 9 in conjunction with FIG. 2, daughterboard housing 72 of daughterboard connector assembly 18 has a cantilevered, flexible latch arm 100 projecting forwardly from and spaced laterally of the front nose portion of the daughterboard housing. The flexible latch arm has an inwardly directed latch hook 100a at the distal end of the arm for latching engagement with a fixed latch shoulder 102 (FIG. 2) on the outside of rear part 40 of adapter assembly 16. Therefore, when daughterboard connector assembly 18 is inserted into receptacle end 68 (FIG. 6) of adapter assembly 16, the daughterboard connector assembly becomes coupled to the adapter assembly by means of latch arm 100/latch hook 100a and latch shoulder 102.

FIG. 10 best shows that daughterboard housing 72 of daughterboard connector assembly 18 includes detent means in the form of a pair of angled release shoulders 104 at the top and bottom thereof. FIG. 3 best shows that the extreme distal ends of latch arms 50 of the adapter assembly have inwardly angled abutment surfaces 106, and these abutment surfaces are exposed for engagement by release shoulders 104 of daughterboard connector assembly 18 when the assembly is inserted into motherboard adapter assembly 16 in the direction of arrow "E" (FIG. 3). When the daughterboard connector assembly is coupled to the adapter assembly (i.e. flexible latch arm 100 engages fixed latch shoulder 102), release shoulders 104 on the motherboard housing engage surfaces 106 on flexible latch arms 50 and bias the latch arms transversely inwardly in the direction of arrows "F" (FIG. 3). When the latch arms are biased inwardly, retention shoulders 50a on the outsides of the flexible latch arms are disengaged from rear side 34b of daughterboard 34, whereupon outside head portions 108 of flexible latch arms 50 move into aperture 32 in motherboard 34. It should be understood that the various parts are constructed so that flexible latch arm 100 engages fixed latch shoulder 102 momentarily before head portions 108 of flexible latch arms 50 are released from rear side 34a of the motherboard. Adapter assembly 16 (along with daughterboard connector assembly 18), thereby, are no longer restricted against axial movement relative to the motherboard. In essence, release shoulders 104 on the daughterboard connector assembly comprise a release means which is effective to release the restrictions on the axial movement of adapter assembly 16 relative to motherboard 34. Therefore, once daughterboard connector assembly 18 is coupled to adapter assembly 16, both the connector assembly and the adapter assembly are allowed to float axially relative to the motherboard. In turn, daughterboard 88 can float relative to the motherboard. This eliminates interacting forces between the daughterboard and the motherboard which, otherwise, could cause cracking, deformation, misalignment and/or poor performance of the boards. When daughterboard connector assembly 18 is coupled with adapter assembly 16, the adapter assembly obviously cannot be pulled forwardly out of the motherboard because the daughterboard connector assembly and/or the daughterboard will abut against the rear side of the motherboard.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector assembly for mounting through an aperture in a panel, comprising:
   an adapter mountable in the aperture in the panel and including engagement means for restricting relative movement between the adapter and the panel;
   a fiber optic connector insertable into the adapter in an insertion direction; and
   release means on the fiber optic connector operatively associated with said engagement means to disengage the engagement means in response to inserting the connector into the adapter and, thereby, remove the restriction on said relative movement between the adapter and the panel.

2. The fiber optic connector assembly of claim 1 wherein said engagement means comprise at least one flexible latch arm on the adapter engageable with the panel at the aperture.

3. The fiber optic connector assembly of claim 2 wherein said release means comprises a detent on the fiber optic connector engageable with said flexible latch arm to move the latch arm out of latching engagement with the panel.

4. The fiber optic connector assembly of claim 1 wherein said adapter includes a housing larger than said aperture in the panel and engageable with one side of the panel, and said engagement means is engageable with an opposite side of the panel.

5. The fiber optic connector assembly of claim 4 wherein said engagement means comprise at least one flexible latch arm on the adapter engageable with the panel at the aperture.

6. The fiber optic connector assembly of claim 5 wherein said release means comprises a detent on the fiber optic connector engageable with said flexible latch arm to move the latch arm out of latching engagement with the opposite side of the panel.

7. The fiber optic connector assembly of claim 6 wherein said detent comprises an angled camming surface.

8. The fiber optic connector assembly of claim 1 wherein said adapter includes a first receptacle end adapted for receiving the fiber optic connector and a second receptacle end adapted for receiving an associated fiber optic transmission means.

9. The fiber optic connector assembly of claim 1 wherein said adapter includes a two-part housing containing at least one shutter member therewithin.

10. A fiber optic connector assembly for mounting through an aperture in a panel, comprising:
    an adapter including a first receptacle end adapted for receiving a fiber optic connector and a second receptacle end adapted for receiving an associated fiber optic transmission means, the adapter being mountable in the aperture in the panel and including a pair of flexible latch arms engageable with the panel at the aperture for restricting relative movement between the adapter and the panel;
    a fiber optic connector insertable into said first receptacle end of the adapter in an insertion direction; and
    a pair of detents on the fiber optic connector engageable with said flexible latch arms on the adapter to disengage the latch arms from the panel in response to inserting the connector into the adapter and, thereby, remove the restriction on said relative movement between the adapter and the panel.

11. The fiber optic connector assembly of claim 10 wherein said detents comprise angled camming surfaces on the fiber optic connector.

12. The fiber optic connector assembly of claim 10 wherein said adapter includes a housing mounting at least one shutter member therewithin.

13. A connector assembly for mounting through an aperture in a panel, comprising:
    an adapter mountable in the aperture in the panel and including engagement means for restricting relative movement between the adapter and the panel;
    a connector insertable into the adapter in an insertion direction; and
    release means on the connector operatively associated with said engagement means to disengage the engagement means in response to inserting the connector into the adapter and, thereby, remove the restriction on said relative movement between the adapter and the panel.

14. The connector assembly of claim 13 wherein said engagement means comprise at least one flexible latch arm on the adapter engageable with the panel at the aperture.

15. The connector assembly of claim 14 wherein said release means comprises a detent on the connector engageable with said flexible latch arm to move the latch arm out of latching engagement with the panel.

16. The connector assembly of claim 13 wherein said adapter includes a housing larger than said aperture in the panel and engageable with one side of the panel, and said engagement means is engageable with an opposite side of the panel.

17. The connector assembly of claim 16 wherein said engagement means comprise at least one flexible latch arm on the adapter engageable with the panel at the aperture.

18. The connector assembly of claim 17 wherein said release means comprises a detent on the connector engageable with said flexible latch arm to move the latch arm out of latching engagement with the opposite side of the panel.

19. The connector assembly of claim 18 wherein said detent comprises an angled camming surface.

20. The connector assembly of claim 13 wherein said adapter includes a first receptacle end adapted for receiving the fiber optic connector and a second receptacle end adapted for receiving an associated transmission means.

* * * * *